(12) United States Patent
Cheng et al.

(10) Patent No.: US 11,795,106 B2
(45) Date of Patent: Oct. 24, 2023

(54) METHOD FOR ECOLOGICAL FILLING WITH MIXED COAL GANGUE AND FLY ASH

(71) Applicant: SHANXI UNIVERSITY, Taiyuan (CN)

(72) Inventors: Fangqin Cheng, Taiyuan (CN); Jianfang Wu, Taiyuan (CN); Huiping Song, Taiyuan (CN); Peihua Zhang, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 17/800,575

(22) PCT Filed: Apr. 25, 2021

(86) PCT No.: PCT/CN2021/089540
§ 371 (c)(1),
(2) Date: Aug. 18, 2022

(87) PCT Pub. No.: WO2022/160484
PCT Pub. Date: Aug. 4, 2022

(65) Prior Publication Data
US 2023/0097415 A1   Mar. 30, 2023

(30) Foreign Application Priority Data
Jan. 28, 2021   (CN) .......................... 202110119415.0

(51) Int. Cl.
*C04B 18/12* (2006.01)
*E02D 31/00* (2006.01)
(Continued)

(52) U.S. Cl.
CPC .......... *C04B 18/12* (2013.01); *C04B 24/2641* (2013.01); *C04B 24/2676* (2013.01);
(Continued)

(58) Field of Classification Search
CPC ...... E02D 31/004; E21F 15/005; C04B 18/12; C04B 24/2641; C04B 24/2676;
(Continued)

(56) References Cited

U.S. PATENT DOCUMENTS 4,705,429 A * 11/1987 Natale ...................... B09B 1/00
241/4

FOREIGN PATENT DOCUMENTS

CN      105523747 A    4/2016
CN      109989430 A    7/2019
(Continued)

OTHER PUBLICATIONS

Wang Hai, et al., Water-preserved coal mining technology in open pit based on cutoff wall with high fly ash content, Journal of China Coal Society, 2020, pp. 1160-1169, vol. 45 No. 3.
(Continued)

*Primary Examiner* — Kyle Armstrong
(74) *Attorney, Agent, or Firm* — Bayramoglu Law Offices LLC

(57) ABSTRACT

A method for ecological filling with mixed coal gangue and fly ash includes the following steps: S1: construction of a double-impermeable base layer: leveling a pit or gully, laying a fly ash-based cementitious material, compacting and curing; spraying a layer of polymer waterproof coating on a surface of the fly ash-based cementitious material, and fully curing to obtain a double-impermeable protective structure; S2: three-dimensional layered filling: dumping coal gangue and fly ash in sequence on the double-impermeable protective structure formed in S1, where the coal gangue and the fly ash are three-dimensionally layered and well graded; the coal gangue is coal gangue after coal washing, which is used as an aggregate; the fly ash is used as a filler and cementitious material to achieve a compact (Continued)

filling structure; and S3: rolling: rolling by a roller after the three-dimensional layered filling.

6 Claims, 3 Drawing Sheets

(51) Int. Cl.
| | |
|---|---|
| *E21F 15/00* | (2006.01) |
| *C04B 24/26* | (2006.01) |
| *C04B 28/02* | (2006.01) |
| *C04B 28/04* | (2006.01) |
| *C04B 28/08* | (2006.01) |
| *C04B 111/00* | (2006.01) |
| *C04B 111/27* | (2006.01) |

(52) U.S. Cl.
CPC ............ *C04B 28/021* (2013.01); *C04B 28/04* (2013.01); *C04B 28/08* (2013.01); *E02D 31/004* (2013.01); *E21F 15/005* (2013.01); *C04B 2111/00508* (2013.01); *C04B 2111/00612* (2013.01); *C04B 2111/00724* (2013.01); *C04B 2111/27* (2013.01)

(58) Field of Classification Search
CPC ....... C04B 28/021; C04B 28/04; C04B 28/08; C04B 211/00508; C04B 211/00612; C04B 211/00724; C04B 211/27
See application file for complete search history.

(56) References Cited

FOREIGN PATENT DOCUMENTS

| | | | |
|---|---|---|---|
| CN | 110529119 A | | 12/2019 |
| JP | H0828200 A | | 1/1996 |
| KR | 20180025391 A | * | 3/2018 |
| NL | 2028205 A | * | 7/2022 |
| WO | WO-2020093704 A1 | * | 5/2020 ............. C04B 30/00 |

OTHER PUBLICATIONS

Liang Wang, et al., Introduction to building engineering, 2014, pp. 51, Xi'an Jiaotong University Press.

Chang-Geng Zhou, Building waterproof leak repair technology, 2005, pp. 105-110, Hebei Science and Technology Press.

* cited by examiner

METHOD FOR ECOLOGICAL FILLING WITH MIXED COAL GANGUE AND FLY ASH

CROSS REFERENCE TO THE RELATED APPLICATIONS

This application is the national phase entry of International Application No. PCT/CN2021/089540, filed on Apr. 25, 2021, which is based upon and claims priority to Chinese Patent Application No. 202110119415.0, filed on Jan. 28, 2021, the entire contents of which are incorporated herein by reference.

TECHNICAL FIELD

The present disclosure relates to the technical fields of environment, ecology and solid waste disposal and utilization, in particular to a method for ecological filling with mixed coal gangue and fly ash.

BACKGROUND

Coal is an important primary energy source in China. The strategic position of coal will remain irreplaceable in the next few decades. Coal gangue is an accompanying product in the process of coal mining and processing. The production of one ton of coal will produce 0.1-0.2 tons of coal gangue. Coal gangue pollution is mainly embodied in the harmful gases such as hydrogen sulfide generated by spontaneous combustion and heavy metals, sulfur and mercury that leach and pollute groundwater and soil. Fly ash is the fine ash obtained after a dust collector collects the flue gas from the boilers of coal-fired power plants and power plants with comprehensive utilization of coal gangue and coal slime resources.

Usually every two tons of coal consumed will produce one ton of fly ash. The fly ash produced by the circulating fluidized bed (CFB) has high content of free CaO and $SO_3$, high water absorption and self-hardening properties, resulting in late expansion and poor stability, which severely restricts the use of the fly ash. The amount of coal gangue and fly ash produced in China is substantial, with a total of more than twenty billion tons. Due to the low utilization level and low utilization rate, more than 3,000 storage yards covering an area of more than 50,000 hectares have been formed, which seriously endangers the health of local residents and the ecological environment.

During open-pit coal mining, pits and gullies are formed. These can easily cause groundwater loss, rock/soil deformation to induce collapse and landslides and other geological disasters. At present, coal gangue, slags, tailings and construction waste are often directly used as fillers for backfilling. Coal gangue includes trace amounts of heavy metals, such as Cd, Pb, Ni, Zn, Cr, and Cu, and there are different heavy metals in different slags and tailings. With long-term rainwater leaching, the heavy metals in the backfill will migrate with rainwater and accumulate, causing pollution to groundwater and surrounding land.

In foreign countries, the bottom of some pits is leveled before filling, and a geomembrane is laid in advance to prevent the migration of leachate. However, the geomembrane is expensive and of limited mechanical strength. In the subsequent backfilling process, large waste slag blocks are easy to damage the geomembrane and cause leakage. In addition, the geomembrane is prone to aging and eventual breach so that pollutants later diffuse into the underground environment. Therefore, it is highly desirable to develop an ecological filling method with mixed coal, gangue and fly ash for open pits and gullies.

SUMMARY

In view of the problems existing in the current filling technology, the present disclosure proposes a method for ecological filling with mixed coal gangue and fly ash that is double-impermeable, oxygen-insulating and flame-retardant. The present disclosure realizes safe ecological disposal of coal-based solid waste through mixed filling.

To solve the above technical problems, the present disclosure adopts the following technical solutions:

A method for ecological filling with mixed coal gangue and fly ash includes the following steps:

S1: construction of a double-impermeable base layer: leveling a pit or gully, laying a fly ash-based cementitious material, compacting and curing. Then, spraying a layer of polymer waterproof coating on a surface of the fly ash-based cementitious material, and fully curing to obtain a double-impermeable protective structure;

S2: three-dimensional layered filling: dumping coal gangue and fly ash in sequence on the double-impermeable protective structure formed in S1, where the coal gangue and the fly ash are three-dimensionally layered and well graded. The coal gangue is coal gangue after coal washing, which is used as an aggregate. The fly ash is used as a filler and cementitious material to achieve a compact filling structure. The fly ash is fluidized bed fly ash, which is sprayed with water to a humidity of 15-30% before use; and S3: rolling: rolling by a roller after the three-dimensional layered filling.

Further, the fly ash-based cementitious material in step S1 may have a thickness of 5-10 cm; the dumped coal gangue on the double-impermeable protective structure in step S2 may have a thickness of 0.4-0.6 m, and the dumped fly ash may have a thickness of 0.2-0.3 m.

Further, the fly ash-based cementitious material may be prepared by mixing fly ash, ultra-fine ash, cement and water in proportions. A mass ratio of the fly ash, the ultra-fine ash and the cement may be (6-8): (1-2):1, and a water-ash ratio may be (2-3):10.

Further, the fly ash may be pulverized coal furnace fly ash or circulating fluidized bed (CFB) boiler fly ash. The ultra-fine ash may be ultra-finely pulverized fly ash with a particle size of 5-10 μm. The cement may be ordinary Portland cement or Portland slag cement.

Further, the polymer waterproof coating may have a thickness of 2-3 mm.

Further, the polymer waterproof coating may be an organic-inorganic composite coating prepared by mixing fly ash, cement and an emulsion. The fly ash may account for 60-90% of a powder filler, and a ratio of the emulsion to the powder filler may be 0.1-0.3.

Further, the emulsion may be a styrene-acrylic emulsion and/or an acrylic emulsion.

Further, the polymer waterproof coating may be specifically prepared as follows: mixing the fly ash and the cement to obtain the powder filler; adding water to the emulsion and stirring at a low speed; adding the powder filler and stirring at a constant speed for 15 min to obtain the polymer waterproof coating.

Compared with the prior art, the present disclosure has the following beneficial effects:

The present disclosure relates to a method for ecological filling with mixed coal gangue and fly ash. The fly ash-based cementitious material at the bottom of the pit forms a hard protective shell with a dense internal structure, and the polymer waterproof coating forms a flexible protective film on the hard protective shell to repair small cracks. Such a double-impermeable structure has a small permeability coefficient, and can effectively block the migration of leachate to the underground environment and achieve zero leakage.

The coal gangue and the fly ash are three-dimensionally filled to form scientifically graded layers. During humidification and rolling, the free $Ca^{2+}$ in the fly ash promotes the formation of a hydrated cementitious product to coat the surface of the coal gangue, which has an oxygen-insulating and flame-retardant effect on the coal gangue. In addition, the hydration expansibility of the fly ash also promotes a more compact structure of the fly ash and the coal gangue.

After a period of time after filling, the self-hardening fly ash will undergo a geo-aggregation reaction to immobilize heavy metals, sulfur, mercury, arsenic and other harmful substances in the coal gangue and the fly ash by means of "mineral phase transformation, solid sealing for passivation and participation in bonding." In this way, these harmful substances are prevented from migration and diffusion along with rainwater. The double-impermeable, oxygen-insulating and flame-retardant ecological filling technology proposed by the present disclosure can effectively prevent pollution caused by spontaneous combustion and leakage, and ensure the environmental friendliness and safety of filling and disposal. After the ecological filling is completed, the process of reclamation, greening and ecological reconstruction can be continued.

DETAILED DESCRIPTION OF THE EMBODIMENTS

The following clearly and completely describes the technical solutions in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

Figure 1:
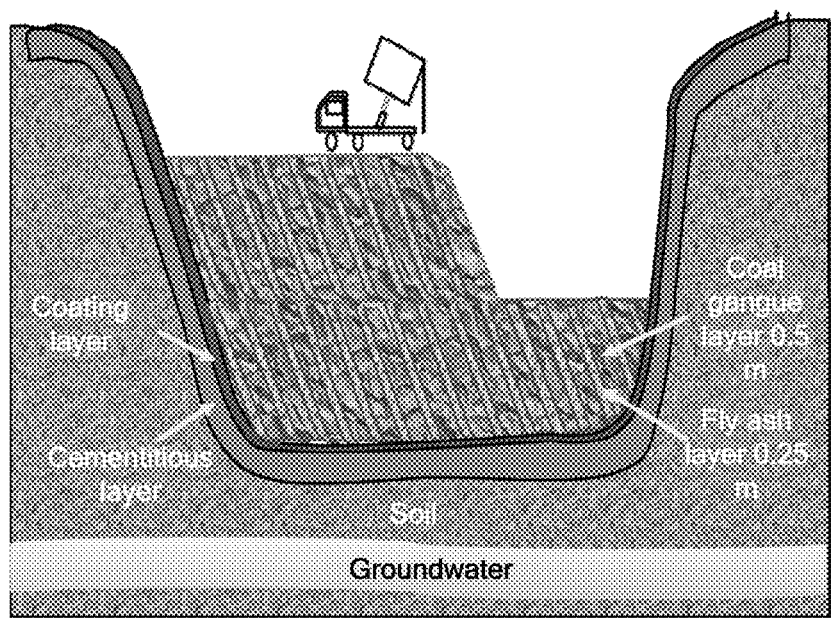
FIG. 1 is a schematic diagram of a method for ecological filling with mixed coal gangue and fly ash that are double-impermeable, oxygen-insulating and flame-retardant according to the present disclosure.
Figure 2:
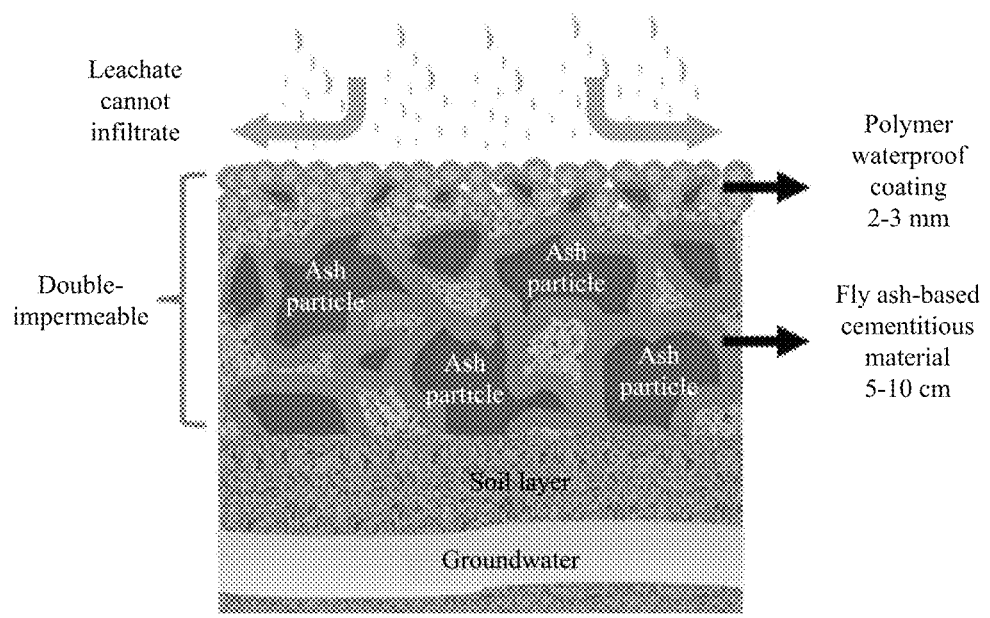
FIG. 2 shows a double-impermeable structure.

As shown in FIG. 1, a method for ecological filling with mixed coal gangue and fly ash includes the following steps:

S1: Construction of a double-impermeable base layer: level a pit or gully, lay a fly ash-based cementitious material, compact and cure; then spray a layer of polymer waterproof coating on a surface of the fly ash-based cementitious material, and fully cure to obtain a double-impermeable protective structure, as shown in FIG. 2.

S2: Three-dimensional layered filling: dump coal gangue and fly ash in sequence on the double-impermeable protective structure formed in S1, where the coal gangue and the fly ash are three-dimensionally layered and well graded. The coal gangue is coal gangue after coal washing, which is used as an aggregate; the fly ash is used as a filler and cementitious material to achieve a compact filling structure. The fly ash is fluidized bed fly ash, which is sprayed with water to a humidity of 15-30% before use. The fly ash humidified in advance by spraying water and the coal gangue after coal washing both have a certain humidity and a low fluidity during dumping, facilitating the dumping and layering during the implementation process.

S3: Rolling: roll by a roller after the three-dimensional layered filling.

In this example, the fly ash-based cementitious material in step S1 has a thickness of 5-10 cm. The dumped coal gangue on the double-impermeable protective structure in step S2 has a thickness of 0.4-0.6 m, and the dumped fly ash has a thickness of 0.2-0.3 m. The fly ash-based cementitious material is prepared by mixing fly ash, ultra-fine ash, cement and water in proportions; a mass ratio of the fly ash, the ultra-fine ash and the cement is (6-8):(1-2):1, and a water-ash ratio is (2-3):10. The fly ash is pulverized coal furnace fly ash or circulating fluidized bed (CFB) boiler fly ash. The ultra-fine ash is ultra-finely pulverized fly ash with a particle size of 5-10 μm. The cement is ordinary Portland slag cement.

In this example, the polymer waterproof coating has a thickness of 2-3 mm. The polymer waterproof coating is an organic-inorganic composite coating prepared by mixing fly ash, cement and an emulsion. The fly ash accounts for 60-90% of a powder filler, and a ratio of the emulsion to the powder filler is 0.1-0.3. The emulsion is a styrene-acrylic emulsion and/or an acrylic emulsion. The polymer waterproof coating is specifically prepared as follows: mix the fly ash and the cement to obtain the powder filler; add the water to the emulsion and stir at a low speed; add the powder filler and stir at a constant speed for 15 min to obtain the polymer waterproof coating.

Example 1

70 kg of CFB boiler fly ash, 20 kg of CFB boiler fly ash with a particle size of 5-10 μm and 10 kg of Grade 32.5 Portland slag cement were mixed uniformly. 22 kg of water was added, and the materials were stirred evenly to obtain a fly ash-based cementitious material. 60 kg of ultra-fine CFB boiler fly ash with a particle size of 5-10 μm and 40 kg of Grade 32.5 Portland slag cement were mixed uniformly to obtain a powder. 30 kg of S400F styrene-acrylic emulsion and 40 kg of water were stirred at a low speed for 2 min. Then the pre-mixed powder was added, and the stirring was continued at a constant speed of 600 r/min for 15 min to obtain a polymer waterproof coating. A 6 cm thick fly ash-based cementitious material was laid on a soil layer at the bottom of a pit, compacted and cured. Then, a layer of about 2.5 mm polymer waterproof coating was sprayed on a surface of the fly ash-based cementitious material to form a double-impermeable structure of cementitious solidification with coating film blocking to effectively prevent the infiltration of leachate.

Figure 3:
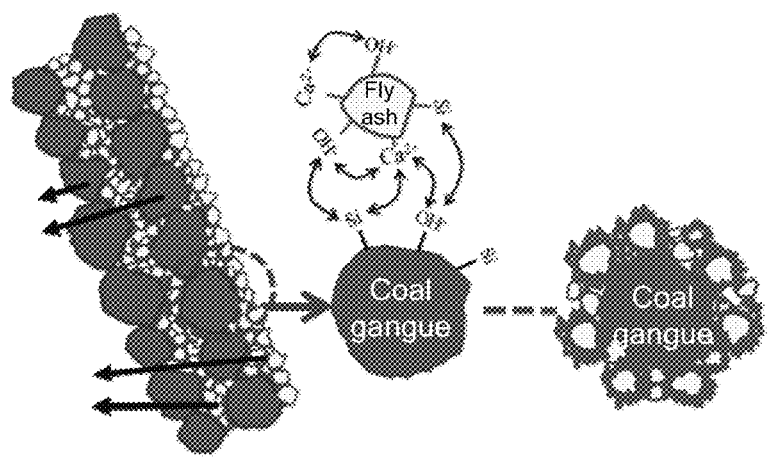
FIG. 3 shows an oxygen-insulating and flame-retardant structure in which a fly ash hydrated product coats coal gangue.

0.4 m of coal gangue and 0.2 m of CFB boiler fly ash were sequentially dumped into the pit from one side to the other to form different layers. The layers had a height of about 10 m in a horizontal direction. They were sprinkled with water to maintain a humidity of 18%, and were compacted by a roller. After 3 days of natural curing, a compressive strength reached 6.4 MPa, and after 7 days of curing, the compressive strength increased to 7.6 MPa. The fly ash formed a hydrated cementitious product to coat the surface of the coal gangue, such that the filled coal gangue and the fly ash formed a tightly integrated whole, which effectively blocked a large amount of air from entering the accumulated body to cause spontaneous combustion or re-ignition. As shown in FIG. 3, during humidification and rolling, free $Ca^{2+}$ in the fly ash promotes the formation of the hydrated cementitious product to coat the surface of the coal gangue, which has an oxygen-insulating and flame-retardant effect on the coal gangue. In addition, the hydration expansibility of the fly ash also promotes a more compact structure of the fly ash and the coal gangue.

Example 2

80 kg of CFB boiler fly ash, 10 kg of CFB boiler fly ash with a particle size of 5-10 μm and 10 kg of Grade 32.5 ordinary Portland cement were mixed uniformly. 25 kg of water was added, ordinary mixed materials were stirred evenly to obtain a fly ash-based cementitious material. 80 kg of CFB boiler fly ash with a particle size of 5-10 μm and 20 kg of Grade 32.5 Portland slag cement were mixed uniformly to obtain a powder. 20 kg of acrylic emulsion and 50 kg of water were stirred at a low speed for 2 min. Then, the pre-mixed powder was added, and the stirring was continued at a constant speed of 600 r/min for 15 min to obtain a polymer waterproof coating. A 6 cm thick fly ash-based cementitious material was injected onto a soil layer at the bottom of a pit, and was cured. Then, a layer of about 2.5 mm of polymer waterproof coating was sprayed on a surface of the fly ash-based cementitious material to form a double-impermeable structure of cementitious solidification with coating film blocking to effectively prevent the infiltration of leachate.

0.5 m of coal gangue and 0.25 m of CFB boiler fly ash were sequentially dumped into the pit from one side to the other to form different layers. The layers had a height of about 10 m in a horizontal direction. They were sprinkled with water to maintain a humidity of 22%, and were compacted by a roller. After 3 days of natural curing, a compressive strength reached 6.4 MPa, and after 7 days of curing, the compressive strength increased to 7.6 MPa. The fly ash formed a hydrated cementitious product to coat the surface of the coal gangue, such that the filled coal gangue and the fly ash formed a tightly integrated whole. After the ecological filling was completed, the process of filling, reclamation, greening and ecological reconstruction could be continued.

Example 3

Fly Ash-Based Cementitious Material
70 kg of CFB boiler fly ash, 20 kg of CFB boiler fly ash with a particle size of 5-10 μm and 10 kg of Grade 32.5 Portland slag cement were mixed uniformly. 22 kg of water was added, and the materials were stirred evenly to obtain a fly ash-based cementitious material. After curing, a compressive strength was tested by a mechanical strength tester. It was 3.8 MPa after 1 d, 8.5 MPa after 3 d, and 21.6 MPa after 7 d.

Example 4

Fly Ash-Based Cementitious Material
80 kg of CFB boiler fly ash, 10 kg of CFB boiler fly ash with a particle size of 5-10 μm and 10 kg of Grade 32.5 ordinary Portland cement were mixed uniformly. 25 kg of water was added, ordinary mixed materials were stirred evenly to obtain a fly ash-based cementitious material. After curing, a compressive strength was tested by a mechanical strength tester. It was 3.4 MPa after 1 day, 8.3 MPa after 3 days, and 20.3 MPa after 7 days.

Example 5

Figure 4:
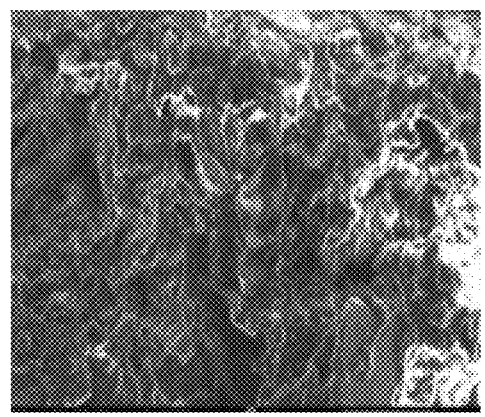
FIG. 4 shows a scanning electron microscope (SEM) image of an internal structure of a coating prepared in Example 5.
Figure 5:
FIG. 5 shows a surface image of a sample prepared in Example 5 after testing by a water impermeability tester for 30 min.

Polymer Waterproof Coating
60 kg of CFB boiler fly ash with a particle size of 5-10 μm and 40 kg of Grade 32.5 Portland slag cement were mixed uniformly to obtain a powder. 30 kg of S400F styrene-acrylic emulsion and 40 kg of water were stirred at a low speed for 2 min. Then the pre-mixed powder was added, and the stirring was continued at a constant speed of 600 r/min for 15 min to obtain a polymer waterproof coating. The polymer waterproof coating was poured into a φ200 circular mold frame, and was naturally cured for 7 d to obtain a sample with a thickness of 2.8 mm. FIG. 4 shows a cross section of the coating. There were no voids in the coating and the structure of the coating was dense and firm. The impermeability of the coating was tested by a water impermeability tester, and the coating was impermeable after 30 min. As shown in FIG. 5, the surface of the coating after the test was still dense without obvious voids.

Example 6

Figure 6:
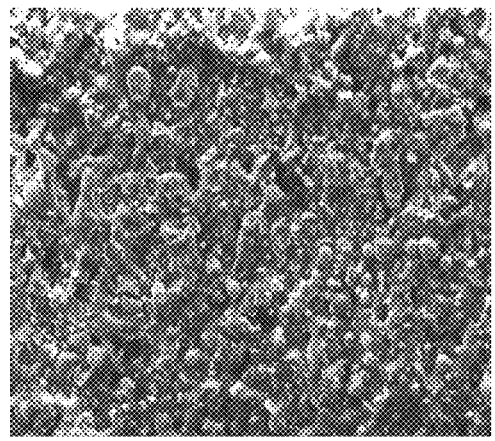
FIG. 6 shows a SEM image of an internal structure of a coating prepared in Example 6.
Figure 7:
FIG. 7 shows a surface image of a sample prepared in Example 6 after testing by a water impermeability tester for 30 min.

Polymer Waterproof Coating
80 kg of CFB boiler fly ash with a particle size of 5-10 μm and 20 kg of Grade 32.5 Portland slag cement were mixed uniformly to obtain a powder. 20 kg of acrylic emulsion and 50 kg of water were stirred at a low speed for 2 min. Then the pre-mixed powder was added, and the stirring was continued at a constant speed of 600 r/min for 15 min to obtain a polymer waterproof coating. The polymer waterproof coating was poured into a φ200 circular mold frame, and was naturally cured for 7 days to obtain a sample with a thickness of 2.6 mm. FIG. 6 shows a cross section of the coating. The internal structure of the coating was compact without obvious voids. The impermeability of the coating was tested by a water impermeability tester, and the coating was impermeable after 30 min. As shown in FIG. 7, the surface of the coating after the test had fine pores, but they were very shallow and impermeable.

Example 7

A 6 cm thick fly ash-based cementitious material prepared in Example 3 was laid on a simulated soil layer, and was compacted and cured. Then, a layer of about 2.5 mm polymer waterproof coating prepared in Example 5 was sprayed on a surface of the fly ash-based cementitious material to form a double-impermeable structure of cementitious solidification with coating film blocking. This structure was tested to have a permeability coefficient of $1.7 \times 10^{-10}$ m/s, and was able to effectively prevent the infiltration of leachate.

The cost accounting is shown in Table 1. The fly ash-based cementitious material cost 2.59 yuan/m², and the polymer waterproof coating material cost 6.42 yuan/m². In the early stage, the construction cost and labor cost for simple leveling, laying, compacting, spraying, etc. of the pit bottom were about 16 yuan/m². In total, the implementation cost of the double-impermeable method of the present disclosure was about 25.0 yuan/m².

A conventional impermeable film was made of a 0.5-0.75 mm thick high-density polyethylene impermeable film, which cost 10-15 yuan/m³. Before the film was laid, the bottom of the pit was finely leveled and covered with a thick layer of loess, which cost 40 yuan/m³. Plus the construction cost and labor cost, etc., the comprehensive cost of the film-based impermeable method was about 30 yuan/m³.

Compared with the film laying method, the cost of the method of the present disclosure was reduced by more than 16.7%.

TABLE 1

Cost accounting of Example 7

| | Materials | | | | | | | |
|---|---|---|---|---|---|---|---|---|
| | Fly ash-based cementitious material | | | | Polymer waterproof coating | | | |
| Composition | Fly ash | Ultra-fine ash | Grade 32.5 cement | Water | Ultra-fine ash | Grade 32.5 cement | Emulsion | Water |
| Amount (%) | 70 | 20 | 10 | 22 | 60 | 40 | 30 | 40 |
| Amount (t) | 0.7 | 0.2 | 0.1 | 0.22 | 0.6 | 0.4 | 0.3 | 0.4 |
| Unit price (yuan/t) | 25% of environmental protection tax, 20 of freight | 80 | 300 | 3 | 80 | 300 | 8000 | 3 |
| Subtotal (yuan/t) | −3.5 | 16 | 30 | 0.66 | 48 | 120 | 2400 | 1.2 |
| Total Costs | (2 t/m³) 43.16 yuan/m³ (Cementitious material, 6 cm thick) 2.59 yuan/m² | | | | 2569.2 yuan/1.7 t (about 1 m³) (Coating, 2.5 mm thick) 6.42 yuan/m³ | | | |

Example 8

A 6 cm thick fly ash-based cementitious material prepared in Example 4 was laid on a simulated soil layer, and was compacted and cured. Then, a layer of about 2.5 mm polymer waterproof coating prepared in Example 6 was sprayed on a surface of the fly ash-based cementitious material to form a double-impermeable structure of cementitious solidification with coating film blocking. This structure was tested to have a permeability coefficient of $6.3 \times 10^{-10}$ m/s, and was able to effectively prevent the infiltration of leachate.

The cost accounting is shown in Table 2. The fly ash-based cementitious material cost 2.09 yuan/m², and the polymer waterproof coating material cost 4.31 yuan/m². In the early stage, the construction cost and labor cost for simple leveling, laying, compacting, spraying, etc. of the pit bottom were about 16 yuan/m². In total, the implementation cost of the double-impermeable method of the present disclosure was about 22.40 yuan/m². The comprehensive cost of a film-based impermeable method was about 30 yuan/m³, and compared with the film laying method, the cost of the method of the present disclosure was reduced by 25.3%.

TABLE 2

Cost accounting of Example 8

| | Materials | | | | | | | |
|---|---|---|---|---|---|---|---|---|
| | Fly ash-based cementitious material | | | | Polymer waterproof coating | | | |
| Composition | Fly ash | Ultra-fine ash | Grade 32.5 cement | Water | Ultra-fine ash | Grade 32.5 cement | Emulsion | Water |
| Amount (%) | 80 | 10 | 10 | 25 | 80 | 20 | 20 | 50 |
| Amount (t) | 0.8 | 0.1 | 0.1 | 0.25 | 0.8 | 0.2 | 0.2 | 0.5 |
| Unit price (yuan/t) | 25% of environmental protection tax, 20 of freight | 80 | 300 | 3 | 80 | 300 | 8000 | 3 |

TABLE 2-continued

Cost accounting of Example 8

| | Materials | | | | | | | |
|---|---|---|---|---|---|---|---|---|
| | Fly ash-based cementitious material | | | | Polymer waterproof coating | | | |
| Composition | Fly ash | Ultra-fine ash | Grade 32.5 cement | Water | Ultra-fine ash | Grade 32.5 cement | Emulsion | Water |
| Subtotal (yuan/t) | −4 | 8 | 30 | 0.75 | 64 | 60 | 1600 | 1.5 |
| Total | (2 t/m³) 34.75 yuan/m³ | | | | 1725.5 yuan/1.7 t (about 1 m³) | | | |
| Costs | (Cementitious material, 6 cm thick) 2.09 yuan/m² | | | | (Coating, about 2.5 mm thick) 4.31 yuan/m² | | | |

Only preferred examples of the present disclosure are described in detail above, but the present disclosure is not limited to the above examples. Within the knowledge of a person of ordinary skill in the art, various variations can also be made without departing from the spirit of the present disclosure and all should be included in a protection scope of the present disclosure.

What is claimed is:

1. A method for ecologically filling an open-pit coal mine comprising a pit or gulley with mixed coal gangue and fly ash, comprising the following steps:
    S1: a construction of a double-impermeable base layer: leveling a pit or gully, laying a fly ash-based cementitious material on the pit or the gully, compacting and curing; then spraying a layer of a polymer waterproof coating on a surface of the fly ash-based cementitious material, and fully curing to obtain a double-impermeable protective structure;
    wherein the fly ash-based cementitious material is prepared by mixing the fly ash, an ultra-fine ash, a cement and water in proportions; a mass ratio of the fly ash, the ultra-fine ash and the cement is (6-8): (1-2):1, and a water-ash ratio is (2-3):10;
    wherein the polymer waterproof coating is an organic-inorganic composite coating prepared by mixing the fly ash, the cement and an emulsion; the fly ash accounts for 60-90% of a powder filler, and a ratio of the emulsion to the powder filler is 0.1-0.3;
    S2: a three-dimensional layered filling: dumping coal gangue and a fly ash in sequence on the double-impermeable protective structure formed in S1, wherein the coal gangue and the fly ash are three-dimensionally layered and well graded; the coal gangue is the coal gangue after a coal washing, and the coal gangue is used as an aggregate; the fly ash is used as a filler and a cementitious material to achieve a compact filling structure; the fly ash is fluidized bed fly ash, and the fly ash is sprayed with water to a humidity of 15-30% before use; and
    S3: a rolling: rolling by a roller after the three-dimensional layered filling.

2. The method for ecologically filling an open-pit coal mine comprising a pit or gulley with the mixed coal gangue and fly ash according to claim 1, wherein the fly ash-based cementitious material in step S1 has a thickness of 5-10 cm; the coal gangue dumped on the double-impermeable protective structure in step S2 has a thickness of 0.4-0.6 m, and the fly ash dumped on the double-impermeable protective structure has a thickness of 0.2-0.3 m.

3. The method for ecologically filling an open-pit coal mine comprising a pit or gulley with the mixed coal gangue and fly ash according to claim 1, wherein the fly ash is pulverized coal furnace fly ash or circulating fluidized bed (CFB) boiler fly ash; the ultra-fine ash is ultra-finely pulverized fly ash with a particle size of 510 μm; the cement is ordinary Portland cement or Portland slag cement.

4. The method for ecologically filling an open-pit coal mine comprising a pit or gulley with the mixed coal gangue and fly ash according to claim 1, wherein the polymer waterproof coating has a thickness of 2-3 mm.

5. The method for ecologically filling an open-pit coal mine comprising a pit or gulley with the mixed coal gangue and fly ash according to claim 1, wherein the emulsion is a styrene-acrylic emulsion and/or an acrylic emulsion.

6. The method for ecologically filling an open-pit coal mine comprising a pit or gulley with the mixed coal gangue and fly ash according to claim 1, wherein the polymer waterproof coating is specifically prepared as follows: mixing the fly ash and the cement to obtain the powder filler; adding water to the emulsion and stirring at a low speed; adding the powder filler and stirring at a constant speed for 15 min to obtain the polymer waterproof coating.

* * * * *